US 6,451,404 B1

(12) United States Patent
Nobuto et al.

(10) Patent No.: US 6,451,404 B1
(45) Date of Patent: Sep. 17, 2002

(54) LEATHER-LIKE SHEET HAVING NAPPED SURFACE

(75) Inventors: Yoshiki Nobuto; Kazundo Akamata; Hisao Yoneda, all of Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/506,683

(22) Filed: Feb. 18, 2000

(30) Foreign Application Priority Data

Feb. 24, 1999 (JP) ............................................. 11-045746
Jul. 15, 1999 (JP) ............................................. 11-201183

(51) Int. Cl.[7] .............................. B32B 33/00; B32B 5/06
(52) U.S. Cl. ........................ 428/91; 428/151; 428/198; 428/904; 442/104; 442/105; 442/149; 442/328; 442/340; 442/351; 442/381; 442/387; 442/388
(58) Field of Search ........................... 428/904, 16, 91, 428/198, 151; 442/340, 346, 345, 363, 392, 328, 105, 351, 149, 381, 383, 384, 387, 388, 402, 408

(56) References Cited

U.S. PATENT DOCUMENTS

| | | | |
|---|---|---|---|
| 4,122,223 A | * 10/1978 | Civardi et al. ................. | 428/91 |
| 4,426,421 A | * 1/1984 | Nakamae et al. ............ | 428/234 |
| 4,476,186 A | * 10/1984 | Kato et al. ................... | 428/290 |
| 4,620,852 A | * 11/1986 | Nishikawa et al. ............ | 8/515 |
| 4,761,324 A | * 8/1988 | Rautenberg et al. ......... | 428/198 |
| 5,298,315 A | * 3/1994 | Fukui et al. ................. | 428/298 |
| 5,461,122 A | * 10/1995 | Yilgor et al. ................. | 525/474 |
| 5,503,899 A | 4/1996 | Ashida et al. | |
| 5,876,466 A | 3/1999 | Nakashima et al. | |

OTHER PUBLICATIONS

Patent Abstracts of Japan, vol. 1998, No. 13, Nov. 30, 1998, JP 10 226968, Aug. 25, 1998.
Patent Abstracts of Japan, vol. 2000, No. 01, Jan. 31, 2000, JP 11 269776, Oct. 5, 1999.
Chemical Abstracts, vol. 101, No. 18, Oct. 29, 1984, XP–002139734, JP 59 137567, Aug. 7, 1984.
Derwent Publications, AN 1995–221024, XP–002139735, JP 07133592, May 23, 1995.
Derwent Publications, AN 1985–212670, XP–002139736, JP 60 134073, Jul. 17, 1985.

\* cited by examiner

*Primary Examiner*—Terrel Morris
*Assistant Examiner*—Jeremy R Pierce
(74) *Attorney, Agent, or Firm*—Oblon, Spivak, McClelland, Maier & Neustadt, P.C.

(57) ABSTRACT

A leather-like sheet having naps on its surface and having writing effect, a high-class external appearance, hand touch and feel like natural leather, and folds like natural leather. When it is subjected to lasting shoemaking, it is possible to obtain shoes which have at its surface no unevenness and do not get out of shape. A leather-like sheet wherein the following fiber-entangled nonwoven fabrics (A) and (B) are stacked with an adhesive agent present in a discontinuous state: (A) a fiber-entangled nonwoven fabric containing an elastic polymer and comprising a microfine fiber (a) having a fineness of 0.1 denier or less, the surface opposite to its stacking surf ace being fluffed, and rupture elongations in the longitudinal and latitudinal directions thereof being 50% or more and 80% or more, respectively, and (B) a fiber-entangled nonwoven fabric containing an elastic polymer and comprising a microfine fiber (b) having a fineness of 0.5 denier or less, the fineness being 4 times or more larger than that of the fiber (a), and rupture elongations in the longitudinal and latitudinal directions thereof being 50% or more and 80% or more, respectively.

13 Claims, 1 Drawing Sheet

LEATHER-LIKE SHEET HAVING NAPPED SURFACE

BACKGROUND OF THE INVENTION

1. Field of the Invention

The present invention relates to a leather-like sheet which has writing (handwriting effect), a high-quality external appearance, and soft hand touch and feel similar to that of natural leather, which has excellent lasting ability in shoemaking and shape-keeping ability after shoemaking. The leather-like sheet has, if necessary, both waterproofness and moisture permeability, and the waterproofness is hardly damaged when an external factor, such as external stress by stretching, scratching, patting or the like, is applied thereto, or in the case that stains and the like adhere thereon. Thus, the leather-like sheet is useful for making to shoes and related articles. The present invention also relates to shoes produced from the leather-like sheet.

2. Description of the Background

Recently, in view of the importance attached to outdoor activity, such as recreation, the use of natural leather suede, natural leather nubuck, suede-like materials and nubuck-like materials, which exhibit casual feeling, is becoming more frequent in the fashion field of shoes. For conventional nubuck-like artificial leather, however, a fiber having a larger fineness is used instead of the collagen fiber which makes actual natural leather nubuck. The conventional nubuck-like artificial leather has a poor external appearance and a rough feel, and thus does not provide a high-quality appearance. When fiber making produces artificial leather having uniform fineness over its whole layers, such fine folds as found in natural leather has cannot be formed. In the case that artificial leather is composed of fibers having different finenesses, the same fact is true because of the mixture of these fibers.

In the case that a napped surface layer is composed of a mixture of a microfine fiber having a fineness of 0.5 denier or less and a fiber having a thickness 4 times larger than that of the microfiber, as described in, for example, Japanese Patent Application Laid-Open No. 59-1749, the leather has a rough feel because of the fibers having different thicknesses. In the case that the leather is dyed, the unevenness of dyeing concentration is easily generated because of the different thicknesses of the fibers. Therefore, the leather does not have a high-quality external appearance. In the case of putting a fiber-entangling web composed of a microfine fiber upon a woven fabric and then integrating them with a needle punch, as described in Japanese Patent Application Laid-Open No. 3-137281, the same problem arises. This is because the fiber, of the woven fabric, having a large fineness is present in its surface or near it.

As an example wherein layers composed of fibers having different thicknesses are stacked and these fibers are not intermixed, Japanese Patent Application Laid-Open No. 59-116477 discloses a technique wherein a woven fabric or knitted fabric is affixed onto an artificial leather composed of a fiber having a fineness of I denier or less and an elastic polymer with an adhesive agent applied in the form of spots. In this technique, however, the affixed layer is the woven fabric or knitted fabric and the thickness of the fiber making it is too large. It can therefore enhance, as a liner material, the strength of the artificial leather, but at the time of lasting in a shoemaking step, unevenness of the woven fabric or knitted fabric is reflected on the surface of the shoes. Alternatively, in accordance with rupture elongation of the woven fabric or knitted fabric, this technique may be unsuitable for the lasting step. Thus, the sorts of shoes to which the technique may be applied are limited.

In many conventional artificial leathers, the whole layers are dyed. Thus, there arises a problem that in the case of using the artificial leathers particularly in shoes, socks and the like may be polluted by their dye in accordance with color fastness of a portion which contacts a foot, i.e., the back face of the leather-like sheets.

In connection with waterproofness, nubuck-like materials do not have any grain layer as a surface layer in same manner as natural leather nubuck. Therefore, when the nubuck-like materials are used in shoes, they do not easily become musty because of larger moisture permeability. Thus, they have an advantage that when a person wears such shoes, the person has a good feeling. On the other hand, the nubuck-like materials have a disadvantage that rainwater permeates through a layer thereof to penetrate very easily into the inside. As a manner for solving this drawback, there is proposed, for example, a method of disposing a waterproof layer onto the back surface of the layer. Such a method has a problem that since the waterproof layer is exposed as a back surface, the waterproof layer is damaged in the case of applying external stress factors such as stretching, writing and padding powers to the back surface.

SUMMARY OF THE INVENTION

The Inventors have investigated nubuck-like sheets which have the hand touch and feel like natural leather, and both lasting ability upon shoemaking and shape-keeping ability, and has, if desired both of waterproofness and moisture permeability, these performances not being damaged by external factors. As this investigation, the Inventors have found that the above-mentioned object can be attained by the following leather-like sheet, and thus have made the present invention: a leather-like sheet wherein the following fiber-entangled nonwoven fabrics (A) and (B) are stacked with an adhesive agent present in a discontinuous state:

(A) is a fiber-entangled nonwoven fabric containing an elastic polymer and comprising a microfine fiber (a) having a fineness of 0.1 denier or less, wherein the surface which is opposite to the surface which is on fabric (B) is fluffed, and having rupture elongations in the longitudinal and latitudinal directions of 50% or more and 80% or more, respectively, and (B) is a fiber-entangled nonwoven fabric containing an elastic polymer and comprising a microfine fiber (b) having a fineness of 0.5 denier or less, the fineness being 4 times or more larger than that of the fiber (a), and having rupture elongations in the longitudinal and latitudinal directions of 50% or more and 80% or more, respectively.

In the present invention, preferably the fiber-entangled nonwoven fabric (A) is dyed and the fiber-entangled nonwoven fabric (B) is not substantially dyed. Optionally, a film layer (C) comprising an elastic polymer and having moisture permeability is between the fiber-entangled nonwoven fabrics (A) and (B). The present invention also relates to a method for producing the sheet. Further, the invention also relates to shoes obtainable by subjecting the above-mentioned leather-like sheet to lasting shoemaking.

Natural leather has, beneath its surface layer comprising a bundle of microfine fibers, a layer comprising slightly thicker fibers than the microfine fibers. Without being limited to any particular theory, it is presumed that the leather-like sheet of the present invention has a sectional structure similar to such a sectional structure of the natural leather and this fact gives hand touch, feel, folds, etc., like those of the natural leather to the leather-like sheet of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
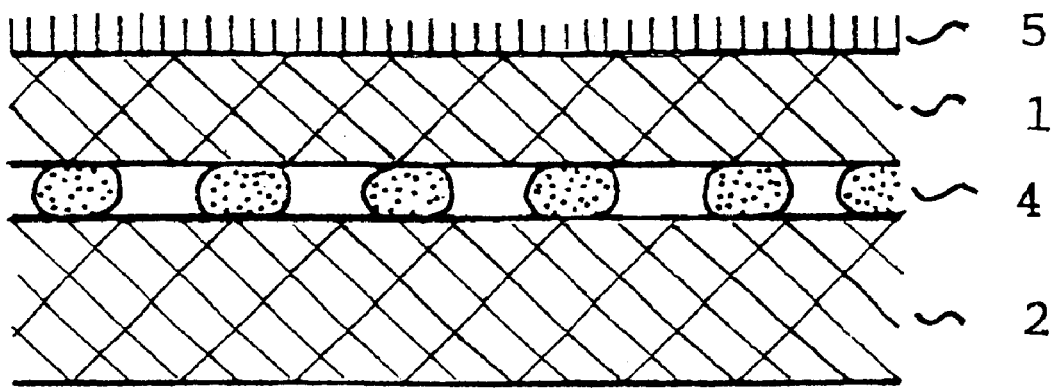
FIG. 1: a schematic sectional view of a leather-like sheet of the present invention without any moisture permeable film layer.
Figure 2:
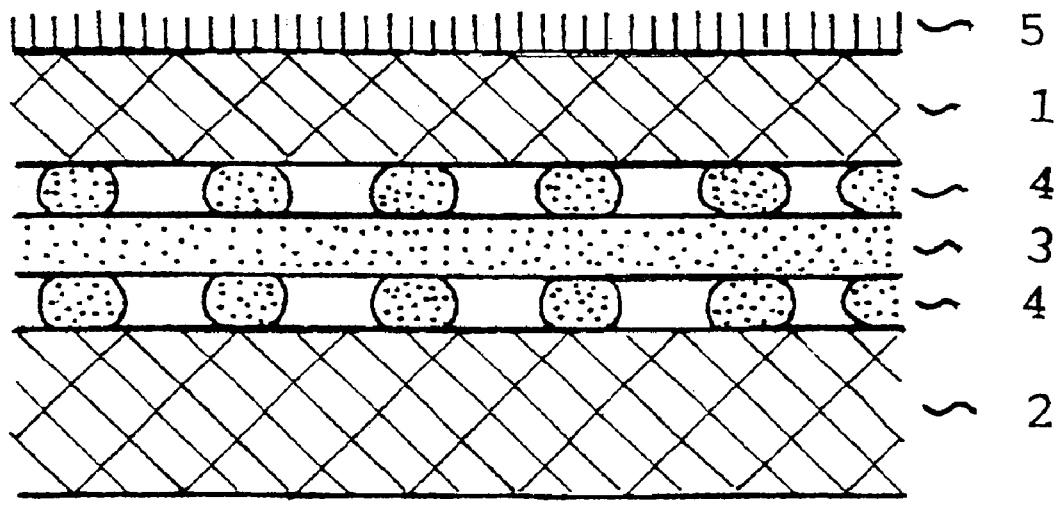
FIG. 2: a schematic sectional view of a leather-like sheet of the present invention with a moisture permeable film layer.

FIGS. 1 and 2 are schematic sectional views of leather-like sheets of the present invention. Reference numbers 1, 2, 3, 4, and 5 represent a nonwoven fabric (A), a nonwoven fabric (B), a moisture permeable film layer, an adhesive layer, and a fluff layer (napped surface layer), respectively. FIG. 1 shows the leather-like sheet without the moisture permeable film layer (C). FIG. 2 shows the leather-like sheet with the moisture permeable film layer (C).

The (A) layer used in the present invention comprises a nonwoven fabric obtained by entangling a microfine fiber having a fineness of 0.1 denier or less, and an elastic polymer with which the nonwoven fabric is infiltrated and is coagulated. The fineness of the fiber making the (A) layer should be 0.1 denier or less, and is preferably within the range of 0.1 to 0.0001 denier. This range includes all specific values and subranges therebetween, such as 0.075, 0.05, 0.03, 0.02, 0.01, 0.005, 0.002, 0.001, 0.0005, 0.0003 and 0.0002 denier. If the fineness is over 0.1 denier, the feel of the napped surface becomes rough and fine gloss cannot be obtained so that the external appearance deteriorates. If the fineness is below 0.0001 denier, the rupture strength of the fiber trends to drop so that the exfoliation strength and rupture strength of the layer drop. Moreover, the color developing ability after dyeing deteriorates.

For producing the microfine fiber, any of the known microfiber producing methods may be used. Examples include a method of subjecting two or more polymers which are not compatible with each other and different in solubility or decomposing property to a spinning manner such as blend spinning or composite spinning so as to obtain a microfine finer generating type fiber wherein its sectional shape has a sea-island structure or a separatable sticking-together structure, extracting or decomposing/removing a part of the fiber, or exfoliating sticking-together portions to obtain the microfine fiber; a method of forming a sheet having a napped surf ace structure, and then extracting or decomposing/ removing a part (for example, the sea component) of the fiber; and so-called melt blow process wherein a fiber-forming polymer is jetted out from a melt spinning nozzle and just thereafter the resultant fiber is blown off with a high-speed gas to make the fiber fine is employed. Preferably, the method using the above-mentioned microfine fiber generating type fiber from the standpoint of control of the thickness of the fiber and stability of the microfine fiber is employed.

The resin constituting the microfine fiber is not especially limited. Examples thereof are polymers selected from known resins, for example, aromatic polyesters such as polyethylene terephthalate, polybutylene terephthalate, polyethylene naphthalate and copolymer polyesters composed mainly of these resins, polyamides such as nylon-6, nylon-66 and nylon-6,10, polyolefins such as polyethylene and polypropylene. The above-mentioned aromatic polyesters and polyamides are preferable because they provide artificial leathers like natural leathers and their dyeability is excellent.

A colorant such as carbon black may be added to these resins so far as it does not damage stability at the time of spinning.

Examples of the resin components that constitute the microfine fiber generating type fiber and are extracted/ removed or decomposed/removed include at least one selected from polymers such as polyethylene, polypropylene, ethylene-propylene copolymer, ethylene-vinyl acetate copolymer, polystyrene, styrene-acrylic monomer copolymer, styrene-ethylene copolymer, and copolymerized polyester. The polyethylene, polystyrene, and copolymer composed mainly of these resins described above are preferred from the standpoint of easy extraction.

The following will describe the method of using the abovementioned microfine fiber or microfiber generating type fiber to produce a substrate. As a method for producing nonwoven fabric, a known methods may be used, for example, a method of the following steps successively: the steps of producing a fiber-entangled nonwoven fabric comprising a microfine fiber generating type fiber, impregnating the fiber-entangled nonwoven fiber with an elastic polymer solution and then solidifying the solution, and modifying the microfine fiber generating type fiber into a microfine fiber. Of course, it is acceptable to reverse the step of the modification into the microfine fiber and the step of the impregnation with the elastic polymer solution and coagulation thereof.

In the method of using a microfine fiber generating type fiber to produce a fiber-entangled nonwoven fabric, the microfine fiber generating type fiber is subjected to treatments such as spinning, drawing, heat-treating, crimping and cutting in a known manner to produce a staple fiber. This staple fiber is unbound with a carder, and then is made into a random web or a cross wrap web with a weber. If necessary, the resultant webs are stacked and made up to a desired weight. The weight of the web is appropriately selected in accordance with a final target use. A preferable range thereof is generally within the range of 100 to 3000 g/m$^2$. This range includes all specific ranges and subranges therebetween, such as 150, 250, 500, 1000, 1500, 2000 and 2500 g/m$^2$. For purpose of low costs or the like, 2 substrates may be effectively produced at a time by impregnating a nonwoven fabric having a weight 2 times larger than a necessary weight, and solidifying the solution and then dividing the resultant in the thickness direction with a band knife or the like. After the stacking of the webs, a known method, such as the needle punching method or the high-pressure water-f low jetting method, is used to subject the webs to a fiber-entangling treatment, so as to produce a fiber-entangled nonwoven fabric. The number of the needle punching and needle punching conditions are different in accordance with the shape of the used needles and thickness of the webs. In general, it is set within the range of 200 to 2500 punches/cm$^2$. This range includes all specific values and subranges therebetween, such as 250, 500, 750, 1000, 1500, and 2000 punches/cm$^2$.

If necessary, the fiber-entangled nonwoven fabric can be subjected to a surface smoothing treatment in a known manner such as thermal press before the impregnating treatment with the elastic polymer. In the case that the fiber constituting the fiber-entangled nonwoven fabric is a sea-island type and microfine generating type fiber having polyethylene as a sea component and a polyester or a polyamide as an island component, the fiber can be made into a fiber-entangled nonwoven fabric having a very good surface smoothness by melting polyethylene as the sea component through thermal press and bonding the fibers to each other. Thus, this fiber is especially preferable. In the case that the fiber constituting the fiber-entangled nonwoven fabric is not a multi-component fiber whose single component is melted and removed to turn into a microfine fiber, the following is preferably performed in order to prevent the fact that the elastic polymer for impregnation adheres to the fiber to give hard hand touch: the surface of the fiber is covered with a temporary filler such as polyvinyl alcohol before the impregnating treatment, and the temporary filler is removed after the addition of the elastic polymer. In the case that the step of making the fiber microfine is performed after the step of the impregnation with the elastic polymer and the coagulation thereof, a softer sheet can be obtained by adding the temporary filler at the stage of the fiber-entangled nonwoven fabric.

As the elastic polymer with which the fiber-entangled nonwoven fabric is impregnated, a known elastic polymer can be used. Any polyurethane resin is preferable from the standpoint of hand touch. Preferable examples of the polyurethane resin include so-called segmented polyurethanes obtained by reacting a diisocyanate compound and a low-molecule chain extending agent with at least one polymer diol which has a number-average molecular weight of 500 to 5000 and is selected from the group of a polyester diol obtained by reacting a diol with a dicarboxylic acid or an ester-producing derivative thereof, a polylactone diol, a polycarbonate diol, and a polyether diol. This range for the molecular weight includes all specific values and sub-ranges therebetween, such as 600, 750, 1000, 1500, 2000, 2500, 3000 and 4800.

From the standpoint of endurance and leather-like hand touch, the above-mentioned diol compounds constituting a soft segment are preferably compounds having 6–10 carbon atoms, examples of which include 3-methyl-1,5-pentanediol, 1,6-hexanediol, 2-methyl-1,8-octanediol, 1,9-nonanediol, and 1,10-decanediol. Typical examples of dicarboxylic acid include aliphatic dicarboxylic acids such as succinic acid, glutaric acid, adipic acid, azelaic acid and sebacic acid; and aromatic dicarboxylic acids such as terephtalic acid and isophtalic acid.

If the number-average molecular weight of the polymer diol is below 500, softness is insufficient so that hand touch like natural leather cannot be unfavorably obtained. If the number-average molecular weight of the polymer diol is over 5000, the concentration of urethane groups is reduced so as not to obtain easily a leather having a good balance of softness, endurance, heat resistance and hydrolysis resistance.

Examples of the diisocyanate compounds are aromatic, aliphatic and alicylic diisocyanate compounds such as diphenylmethane-4,4'-diisocyanate, tolylene diisocyanate, hexamethylene diisocyanate, isophorone diisocyanate, and dicyclohexylmethane-4,4'-diisocyanate.

Examples of the low-molecule chain extending agent include low molecular compounds having a molecular weight of 300 or less and two active hydrogen atoms, such as ethylene glycol, propylene glycol, butane diol, hexane diol, N-methyldiethanolamine and ethylenediamine.

If desired, a coagulation adjuster, a stabilizer or the like may be added to the elastic polymer. Two or more polymers may be used together. A colorant such as carbon black may be added thereto.

The method for impregnating the fiber-entangled nonwoven fabric with the elastic polymer is not particularly limited. From the standpoint of the balance of hand touch, however, preferable are a method of impregnating the fiber-entangled nonwoven fabric directly with an elastic polymer solution and, if necessary, squeezing the resultant with a mangle; a method of coating the nonwoven fabric with an elastic polymer solution by means of a coater and simultaneously infiltrating the solution into the fabric; and the like. From the standpoint of soft hand touch like natural leather, the weight ratio of the fiber constituting the nonwoven fabric (fiber which has been subjected to the treatment for making the fiber microfine in the case that any microfine fiber generating type fiber is used) to the elastic polymer is preferably from 20/80 to 95/5 and more preferably from 25/75 to 90/10. These ranges include all specific values and sub-ranges therebetween, such as 30/70, 40/60, 50/50, 60/40, 70/30, 80/20, and 85/15. If the proportion of the fiber is too low, the leather-like sheet unfavorably comes to have rubber-like hand touch. If the proportion of the fiber is too high, the leather-like sheet comes to have paper-like hand touch. Thus, target hand touch like natural leather cannot be obtained.

After the impregnation of the fiber-entangled nonwoven fabric with the elastic polymer, the resultant is treated with a liquid which functions as a non-dissolving agent for the island component of the elastic polymer and the microfine fiber generating type fiber and functions as a dissolving agent or a discomposing agent for the sea component thereof. Thus, the microfine fiber generating type fiber is modified to a microfine fiber bundle so as to obtain a sheet composed of the microfine fiber-entangled nonwoven fabric and the elastic polymer. Of course, it is possible to obtain the sheet by using a method of modifying microfine fiber generating type fiber to the microfine fiber bundle before the impregnation with the elastic polymer.

The napped surface of the resultant nonwoven fabric composed of the microfine fiber-entangled nonwoven fabric and the elastic polymer are caused to stand by any known method such as buffing or brushing. The length of the naps has an affect on the sense of touch, and external appearances such as gloss. Thus, a desired length of the naps can be obtained by adjusting buffing or brushing conditions, for example, the roughness degree of a sandpaper used for the buffing, buffing speed, or pushing pressure.

It is important for the thus-obtained sheet composed of the fiber-entangled nonwoven fabric and the elastic polymer to have rupture elongations in the longitudinal direction and in the latitudinal direction of 50% or more and 80% or more, respectively. Upon lasting of the step of shoemaking, in order to extend the sheet by about 30%, the sheet preferably has rupture elongations in the longitudinal direction and in the latitudinal direction of 50% or more and 80% or more, respectively. If the rupture elongations are below these values, there may unfavorably arise defect-s such as rupture upon the lasting or cracks in the surface of the leather-like sheet. The sheet more preferably has rupture elongations in the longitudinal direction and in the latitudinal direction of 55 to 150% (both inclusive) and of 85 to 200% (both inclusive), respectively. This range for the rupture elongations in the longitudinal direction includes all specific values and subranges therebetween, such as 60, 75, 100, 125, 135 and 145%. This range for the rupture elongations in the latitudinal direction includes all specific values and sub-ranges therebetween, such as 90, 100, 110, 125, 130, 150, 175, 180, 190 and 195%.

In order to set the rupture elongations in the longitudinal direction and in the latitudinal direction up to 50% or more and 80% or more, respectively, it is generally preferable to use the method of increasing the number of punch at the time when the microfine fiber or the microfine fiber generating type fiber is entangled with a needle punch. Therefore, on the basis of results obtained by needle-punching up to an appropriate needle-punching number and measuring the rupture elongation of the resultant sheet, the needle punching number is increased or decreased so that a sheet having a required rupture elongation can be obtained. On the other hand, in the case that a woven fabric or knitted fabric is integrated with the nonwoven fabric to reinforce the nonwoven fabric, its rupture elongation unfavorably trends to be low.

In order to prevent obtaining out shape of shoes from shoemaking, prevent generation of unevenness of the surface at the time of the lasting in the shoemaking, and improve resistance against friction of the back surface of the sheet, the above-mentioned (B) layer is integrated with the (A) layer. The (B) layer in the present invention is a layer composed of both a fiber-entangled nonwoven fabric comprising a fiber having a fineness of 0.5 denier or less and an elastic polymer. The (B) layer is equal to the (A) layer except that the fineness of the fiber is 0.5 denier or less. The resin constituting the fiber, the producing method thereof, the resin constituting the elastic fiber and the producing method thereof are equal to those about the (A) layer. Therefore, the resin component of the fiber and the elastic polymer component of the (A) layer may be the same as those of the (B) layer. The treatment for causing napped surface, which is important for the (A) layer, is unnecessary, but may be performed.

The fineness of the fiber constituting the (B) layer should be 0.5 denier or less. If the fineness is over 0.5 denier, unevenness is generated in the surf ace at the time of the lasting in shoemaking to deteriorate the external appearance. More preferably, the fineness is within the range of 0.1 to 0.001 denier. The fineness of the fiber constituting the (B) layer is essentially 4 times or more and preferably 5–1000 times larger than that of the fiber constituting the (A) layer. This range includes all specific values therebetween, such as 10, 25, 50, 100, 250, 500 and 750 times larger than that of the fiber constituting the (A) layer. If the difference in the fineness is below 4 times, natural hand touch like natural leather cannot be obtained to deteriorate the quality or the shape-keeping ability upon the lasting. The fineness (average thickness) of the fibers constituting the (A) layer and (B) layer can be obtained by taking photographs of sections of the respective layers in their thickness direction with an electron microscope, selecting 100 fibers at will on the photographs, obtaining thicknesses of the respective fibers from their sectional areas, summing up the thicknesses of the 100 fibers, and dividing the total value by 100. The limitation of the rupture elongation about the (B) layer is the same as about the (A) layer. If rupture elongations in the longitudinal direction and in the latitudinal direction are not set to 50% or more and 80% or more, respectively, the same problems as regards the (A) layer arise.

The (A) layer and the (B) layer constituting the present invention are stacked with an adhesive agent present in a discontinuous state. The resin used as the adhesive agent is not especially limited but is generally an existing polyurethane resin. The resin used for the bonding may be the same as or different from the resin constituting the elastic polymer of the (A) layer and (B) layer. A stabilizer, a colorant, particles or the like may be added to the resin used for the bonding if necessary and they do not highly damage the adhesive performance.

When the (A) layer and (B) layer are stacked in the present invention, they are preferably stacked in the manner that the longitudinal direction of the (A) layer and that of the (B) layer are along the same direction.

The method for applying the resin for the bonding is not especially limited, and may be a method of dissolving the resin into a solvent and then applying the solution, a hot-melt method, or the like.

Concerning the form of the applied resin for the bonding, it is necessary that the adhesive resin is present in a discontinuous form. Specific examples are spot-form application or line-form application. In order to average expansion and contraction elasticity of the length and breadth of the stacked body composed of the (A) layer and the (B) layer, the spot-form application is preferable. Especially preferable is the spot-form application of the adhesive resin with a gravure roll. The mesh of the gravure roll is not especially limited, and is usually from 50 to 200 meshes. When the applied resin for the bonding is present in a continues form, the hand touch unfavorably becomes hard. The discontinuity referred to in the present invention means any state except the state that the applied adhesive agent substantially continues without any break in the longitudinal and lateral directions. The applied amount of the adhesive agent is preferably from 1 to 30 g/m$^2$ as a solid basis. This range includes all sub-ranges therebetween, such as 2, 5, 8, 10, 12, 15, 20 and 25 g/m$^2$.

The structure of the leather-like sheet of the present invention is characterized in that fibers spreading over both of the (A) layer and the (B) layer are not substantially present since both the layers are stacked with the adhesive agent present in a discontinuous state. By such a structure, it is possible to attain high-class hand touch, feel and external appearance based on the microfine fiber constituting the (A) layer, prevent a drop in the fastness of the back surface by dyeing of only the (A) layer and, if necessary, putting a waterproof film between the (A) and (B) layers.

In the present invention, it is preferable that the (A) layer is dyed and the (B) layer is not substantially dyed. The dyeing referred to in the present invention means that the layer which is composed of the fiber-entangled nonwoven fabric comprising the microfine fiber and the elastic polymer and constitutes the (A) layer is formed and subsequently dyeing with a dye is performed. The meaning of the dyeing does not include the step of adding a pigment or a dye such as carbon black beforehand to the microfine fiber or fine fiber, or the elastic polymer which constitutes each of the (A) and (B) layers. Therefore, for the case that coloring is performed with carbon black in the step of producing the fine fiber or the elastic polymer which is a constituent of the (B) layer, the wording "dyeing" is not used.

Dyeing costs are lower in the case of dyeing only the (A) layer than in the case of dyeing both the (A) and (B) layers. When the leather-like sheet of the present invention is used for shoes or the like, the portion that contacts a foot is not polluted with any dye.

The thickness of the leather-like sheet made by stacking the (A) and (B) layers as described above is not especially limited. When the sheet is used to manufacture shoes, it is preferable that the thicknesses of the (A) and (B) layers are from 0.25 to 1.8 mm and from 0.25 to 2.5 mm, respectively, and the thickness of the suede-like and leather-like sheet resulting from the stacking is from 0.5 to 3 mm. From the standpoint of dyeing costs and folds, it is preferable that the (A) layer is thinner than the (B) layer.

If desired in the present invention, a (C) moisture permeable layer comprising an elastic polymer is put between the (A) layer and the (B) layer. By putting the (C) layer between the (A) layer and the (B) layer, that is, by stacking the (A) layer, the (C) layer, the (B) layer in this order, waterproofness can be provided. Since the (C) layer is put between the (A) layer and the (B) layer, the (C) layer is hardly damaged. Therefore, even if an external power is applied to the leather-like sheet, the waterproofness is seldom damaged. The (C) layer will be in detail described below.

The (C) layer of the present invention is a moisture permeable film layer comprising an elastic polymer. Its water-vapor permeability is not especially limited. In order to set the water-vapor permeability of the leather-like sheet to any water-vapor permeability that is generally required for shoes which do not get musty, that is 700 $g/m^2/24$ hours or more according to the measuring method of JIS K-6549, incorporated herein by reference (the wording "the measuring method of JIS K-6549" is omitted hereinafter), it is preferable to use a film-form elastic polymer having a water-vapor permeability of 1000 $g/m^2/24$ hours or more. The thickness of the (C) layer is preferably from 5 to 40 $\mu m$ from the standpoint of balance between waterproofness and hand touch. If the thickness is below 5 $\mu m$, the waterproofness trends to drop. On the other hand, if the thickness is over 40 $\mu m$, the hand touch trends to become hard.

The film layer may be porous or nonporous. In the case that the film layer is porous, the average diameter of pores is preferably 3 $\mu m$ or less. This is because there arise such problems that the waterproofness may deteriorate or the strength of the film may drop in accordance with the diameter of the pores.

The components of the elastic polymer is not especially limited. Generally, a polyurethane resin is used. When especially high moisture permeability is required, a polyurethane having a polyether chain as a main chain is preferably used. As the method for molding the elastic polymer into a film-form, any known wet method may be used in the case of the porous layer. In the case of the nonporous layer, there may be used a method of dissolving the elastic polymer into a solvent and then preparing a dry film on a release paper. In the case that the polymer has thermoelasticity, a thermally-melting molding method such as T-die extrusion may be used. However, the molding method is not especially limited.

In the present invention, the film-form elastic polymer constituting the (C) layer must have a higher rupture elongation than the (A) layer and the (B) layer. The rupture elongation referred to in the present invention is a value measured according to JIS K-6550. Preferably, the rupture elongation of the (C) layer has a higher than both of the rupture elongations of the (A) layer and the (B) layer by 10% or more. If the rupture elongation of the (C) layer is lower than those of the (A) layer and the (B) layer, the (C) layer is ruptured upon the lasting in shoemaking so that waterproofness may not be obtained.

As described above, the adhesive agent used for stacking the (A), (C) and (B) layers in this order is not especially limited. For keeping moisture permeability, a polyurethane resin having a polyether chain as a main chain is preferably used because of high moisture permeability. The resin for the bonding may be the same as or different from the resin constituting the elastic polymer of the (C) layer.

When the (A) and (C) layers are bonded or the (C) and (B) layers are bonded, the resin for the bonding is usually applied to the (A) layer and (B) layer simultaneously or successively, the (C) layer is put on the resin-applied surface. It is not preferable to apply the resin for the bonding directly to the (C) layer because the (C) layer is dissolved or decomposed by a solvent or heat to damage waterproofness. It is however allowable that the (C) layer is bonded to either of the (A) layer or the (B) layer, as the case of the (C) layer is bonded to the (A) layer, and subsequently the resin for the bonding is applied to the (C) layer.

The method of applying the resin for the bonding upon the bonding of the (A) layer and the (C) layer and the bonding of the (C) layer and the (B) layer, the necessity that the adhesive agent is present in a discontinuous state, and the like are the same as in the case of bonding of only both of the (A) layer and (B) layer, and are as described above. It is allowable to use a method of applying the melted resin for the bonding with a gravure, bonding the layers, and subsequently cooling the resultant, that is, a so-called hot-melt method.

The waterproofness of the thus obtained stack body comprising the (A), (C) and (B) layers, that is, the leather-like sheet to which waterproofness is given is preferably 1500 mm or more according to the JIS L-1079 method, incorporated herein by reference (the wording "the JIS L-1079 method" is omitted hereinafter). The water-vapor permeability thereof is preferably 700 $g/m^2/24$ hours or more. In the case that the leather-like sheet is applied to shoes, by setting its water-proof to 1500 mm or more, rainwater does not permeate from the surf ace of the sheet into the inside. The same fact is true even if the shoes are put into a water pool, a shoal of a river or the like. In the same case, by setting its water-vapor permeability to 700 $g/m^2/24$ hours or more, it is possible to prevent getting musty and keep a good feeling when a person wears the shoes. More preferable are a water-proof of 1500 mm or more for 10 minutes or more, and a water-vapor permeability of 1000 $g/m^2/24$ hours or more. However, from the viewpoint of product-quality, it is difficult to produce the sheet having a water resistance over 10000 mm and a water-vapor permeability over 2500 $g/m^2/24$ hours.

A water repellent such as a fluorine-based water repellent may be added to the leather-like sheet. By water repellent treatment, pollution is prevented. Moreover, it is possible to prevent the phenomenon that when the sheet is applied to shoes, water soaks into the surface layer corresponding to the (A) layer to increase the weight of the shoes. Thus, the water repellency is especially effective. So far as the effect of the present invention is not damaged, a microfine fiber layer or another resin layer may be put between the (A) layer and (B) layer, between (A) layer and (C) layer, or between the (C) layer and the (B) layer. Moreover, a microfine fiber layer or another resin layer may be deposited on the surface opposite to the surface, of the (B) layer, contacting the (A) layer or (C) layer.

The thus obtained leather-like sheet is useful for raw material of usual shoes such as casual shoes for outdoors and shorts shoes, and high-quality shoes which have been subjected to a lasting step.

EXAMPLES

The following will describe the present invention by way of specific Examples. The present invention is not however limited thereto. The "part(s)" in the Examples represents "part(s) by weight" unless otherwise specified.

In the present invention, the rupture elongations of the (A) layer, (B) layer and the (C) layer are measured according to JIS L-1096, incorporated herein by reference. The advance direction upon the production of substrates thereof corresponds to the longitudinal direction. The direction perpendicular thereto corresponds to the latitudinal direction. The thicknesses thereof are measured according to JIS L-1096 when a load of 240 g/cm$^2$ is applied.

In the Examples, water-proof and water-vapor permeability were measured according to JIS K-1079 and JIS K-6549, respectively, both incorporated herein by reference. The inventors judged external appearances, considering the sense of touch, gloss and the like. Good, ordinary and bad external appearances are shown as ○, Δ and X, respectively.

Production Example 1

Nylon-6 (relative viscosity: 2.8) and polyethylene were mixed at a weight ratio of 50 to 50 in the state of chips, and the mixture was subjected to melt-spinning with an extruder. The mixture fiber having a sea-island section whose sea component was polyethylene and whose island component was 6-nylon was drawn, crimped and cut to produce a short staple fiber having a fineness of 4 deniers and a length of 51 mm. From the fiber, a cross warp was produced with a weber. The cross wrap was subjected to needle-punching under the condition of 700 punches/cm$^2$ with a needle-punching machine to obtain a fiber-entangled nonwoven fabric. This fibrous sheet was impregnated with a solution of a poly 3-methylpentane adipate/polyethylene glycol copolymer-based polyurethane resin in dimethylformaldehyde. The solution was wet-coagulated, and polyethylene as the sea component of the fiber was extracted with toluene of 80° C. to obtain a substrate layer having an average weight of 450 g/m$^2$, a thickness of 1.3 mm and a ratio of the polyurethane resin to the fiber of 50/50. The fineness of the microfine nylon fiber of the resultant sheet was 0.006 denier. The single side of the resultant substrate layer was buffed with a sandpaper to obtain a substrate (A)-1 having a napped surface comprising the microfine nylon fiber. The rupture elongations in the longitudinal and latitudinal directions of this substrate were 70% and 95%, respectively.

Production Examples 2

Both surfaces of the substrate layer obtained in Production Example 1 were buffed with a sandpaper to make the surfaces into napped surfaces comprising the microfine nylon fiber. Thereafter, the resultant was sliced exactly at the middle of the thickness direction into 2 parts to obtain substrates (A)-2 having an average weight of 220 g/m$^2$ and a thickness of 0.6 mm. The two substrates obtained at the front and backsides had the same external appearance, average weight and thickness. The rupture elongations in the longitudinal and latitudinal directions of these substrates were 75% and 110%, respectively.

Production Example 3

Nylon-6 (relative viscosity: 2.4) and polyethylene were mixed at a weight ratio of 50 to 50 in the state of chips, and the mixture was subjected to melt-spinning with an extruder. Thus, a mixture fiber having a sea-island section whose sea component was polyethylene and whose island component was 6-nylon was obtained. This fiber was drawn, crimped, and cut to produce a short fiber having a fineness of 3.5 deniers and a length of 51 mm. From the fiber, a cross warp was produced with a weber. The cross wrap was subjected to needle-punching under the condition of 1500 punches /cm$^2$ With a needle-punching machine to obtain a fiber-entangled nonwoven fabric. This fibrous sheet was impregnated with a solution of a poly 3-methylpentane adipate/polyethylene glycol copolymer-based polyurethane resin in dimethylformaldehyde. The solution was wet-coagulated, and polyethylene as the sea component of the fiber was extracted with toluene of 80° C. to obtain a substrate layer having an average weight of 305 g/m$^2$, a thickness of 0.9 mm and a ratio of the polyurethane resin to the fiber of 55/45. The fineness of the microfine nylon fiber of the resultant sheet was 0.04 denier. Both surfaces of the substrate layer obtained were buffed with a sandpaper to make the surfaces into napped surfaces comprising the microfine nylon fiber. Thereafter, the resultant was sliced exactly at the middle of the thickness direction into 2 parts to obtain substrates (A)-3 having an average weight of 150 g/m$^2$ and a thickness of 0.4 mm. In this Production Example, the resultant two substrates also had the same external appearance and physical properties. The rupture elongations in the longitudinal and latitudinal directions of the substrates were 80% and 105%, respectively.

Production Example 4

Nylon-6 (relative viscosity: 2.6) and polyethylene were separately melted, and they were jointed just before a spinneret and spun to obtain a composite fiber in a sea-island form wherein the weight ratio thereof was 50/50 and the nylon-6 was an island component and the polyethylene was a sea component. The fiber was drawn, crimped, and cut to produce a short staple fiber having a fineness of 5 denier and a length of 52 mm. From the fiber, a cross warp was produced with a weber. The cross wrap was subjected to needle-punching under the condition of 1000 punches /cm$^2$ with a needle-punching machine to obtain a fiber-entangled nonwoven fabric. This fibrous sheet was impregnated with a solution composed mainly of a polytetramethylene ether-based polyurethane resin in dimethylformaldehyde (abbreviate as DMF). The solution was wet-coagulated, and polyethylene as the sea component of the fiber was extracted with toluene of 80° C. to obtain a substrate (B)-1 having an average weight of 580 g/m$^2$, a thickness of 1.5 mm and a ratio of the polyurethane resin to the fiber of 58/42. The fineness (average thickness) of the fiber after the extraction was 0.25 denier. The rupture elongations in the longitudinal and latitudinal directions of this substrate were 75% and 101%, respectively.

The single side of the substrate (B)-1 was buffed with a sandpaper to obtain a substrate (A)-4 having a napped surface comprising the microfine nylon fiber.

Production Example 5

A fiber comprising only nylon-6 (relative viscosity: 2.6) and having a fineness of 1.5 deniers and a length of 51 mm was used to perform the same manner as in Production Example 1. Thus, a fiber-entangled nonwoven fabric was obtained. Further, the same manner as in Production Example 1 was performed except that the extracting treatment with toluene was not conducted, to obtain a substrate (B)-2 having a ratio of the polyurethane resin to the fiber of 27/73. The rupture elongations in the longitudinal and latitudinal directions of the substrates were 65% and 85%, respectively.

Dyeing Example

The substrates obtained in Production Examples 1–4 were dyed with a red metal-complex dye, under the condition that owf became 10%, at 90° C. for 1 hour in a wince dyeing machine.

Examples 1–3

A solution of a polyester type polyurethane in DMF as an adhesive agent was applied in the form of spots to the three substrates (B)-1 obtained in Production Example 4 with a gravure toll of 140 meshes [applied amount (solid content):3 g/m$^2$], and just thereafter each of the dyed substrates (A)-1 to 3 was stuck onto each of the substrates in the manner that their longitudinal and latitudinal directions were consistent, to obtain a leather-like sheet.

The resultant leather-like sheets had a high-class external appearance, and soft hand touch and feel similar to that of natural leather. Natural folds were also realized. The color fastness of the non-dyed back surface was 5th class. In order to use the resultant leather-like sheets for upper leathers of shoes, the sheets were stretched by 30% and subjected to lasting shoemaking to produce sports shoes. As a result, in all cases the sports shoes had in their surfaces no unevenness and had high class feeling like natural leather.

Example 4

A release paper was coated with a 15% solution of a polyurethane (Highmulene Y-301-3, made by Dainichiseika Color & Chemicals Mfg. Co., Ltd., a polyethylene glycol type polyurethane) in DMF and then a known manner was performed to produce a polyurethane film of 20 μm in thickness (water-vapor permeability: 250 g/m$^2$/24 hours. The film contain no fiber and was nonporous. The rupture elongations in the longitudinal and latitudinal directions were 350% and 380%, respectively. (The film was abbreviated to Y-301-3 hereinafter). This film was used as a middle layer between the dyed substrate (A)-2 and the substrate (B)-1 to stack the (A)-2 layer, the polyurethane film, and the (B)-1 layer in this order.

As an adhesive agent, polyurethane (Highmulene Y-301-3, made by Dainichiseika Color & Chemicals Mfg. Co., Ltd.) dissolved in DMF was used. A solution of the adhesive agent was applied in the form of spots to bonding surfaces of the respective (A)-2 and (B)-1 layers with a gravure roll of 140 meshes [the applied amount (solid content): 3 g/m$^2$]. They were bonded to obtain a leather-like sheet.

The resultant leather-like sheet had both of sufficient water resistance, water-vapor permeability and external appearance for original fabric for shoes. The sheet was stretched by 30% and subjected to lasting shoemaking to produce sports shoes. As a result, all shoes had in their surfaces no unevenness speckles and had a high quality feeling like natural leather. The shoes were soaked into a water bath of 4 cm in depth and allowed to stand still for 2 days so that water never permeated through the leather-like sheet into the inside of the shoes. A part of the surface of the leather-like sheet was scrubbed with a sandpaper to give injuries. However, no problems arose regarding waterproofness.

Comparative Example 1

A solution of a polyester type polyurethane in DMF as an adhesive agent was applied in the form of spots to the substrate (B)-1 obtained in Production Example 4 with a gravure roll of 140 meshes. Just thereafter, the dyed substrate (A)-4 was stuck thereto to obtain a leather-like sheet.

The surface of the resultant leather-like sheet had a rough feel and lacked high-quality feeling.

Comparative Example 2

The cross wrap which was produced by spinning in Production Example 1 and had an average weight of 250 g/m$^2$ was stacked on the cross wrap which was produced by spinning in Production Example 4 and had an average weight of 350 g/m$^2$, and then the resultant was needle-punched at 700 punches /cm$^2$ with a needle-punching machine to obtain a fiber-entangled nonwoven fabric. This fibrous sheet was impregnated with a solution of poly 3-methylpenetane adipate/polyethylene glycol copolymer type polyurethane in dimethylformaldehyde, and then the solution was subjected to wet coagulation. Thereafter, polyethylene as a sea component of the fabric was extracted with toluene of 80° C. to obtain a substrate layer having an average weight of 460 g/m$^2$, a thickness of 1.3 mm and a ratio of the polyurethane resin to the fiber of 45/55. One side of the microfine nylon fiber of the resultant sheet was composed mainly of a fiber having a denier of 0.006, and the other side thereof was composed mainly of a fiber having a denier of 0.25 denier. The face, of the resultant substrate layer, composed mainly of the fiber having a denier of 0.006 was buffed with a sandpaper to obtain a substrate (A)-5 having a napped surface comprising the microfine nylon fiber. The rupture elongations in the longitudinal and latitudinal directions of these substrates were 72% and 90%, respectively. The resultant substrate was dyed with the method described in the Dyeing Example to obtain a leather-like sheet.

The obtained leather-like sheet had a relatively good appearance but had a somewhat rough sense of touch. Natural folds were not obtained. The color fastness of the back face was third class.

Comparative Example 3

Bonding was performed in the same manner as in Example 1 except that the substrate (B)-1 was replaced with the substrate (B)-2 to obtain a leather-like sheet. The sheet was processed into shorts shoes. The shoes had a poor surface smoothness. The above-mentioned Examples and Comparative Examples described above are shown in Table 1.

TABLE 1

|  | Example 1 | Example 2 | Example 3 | Example 4 | Comparative Example 1 | Comparative Example 2 | Comparative Example 3 |
|---|---|---|---|---|---|---|---|
| Upper layer | Substrate (A)-1 | Substrate (A)-2 | Substrate (A)-3 | Substrate (A)-2 | Substrate (A)-4 | Substrate (A)-5 | Substrate (A)-1 |
| Dyeing of the Upper layer | Done | Done | Done | Done | Done | Done | Done |
| Middle layer | — | — | Y-301-3 | — | — | — | — |
| Lower layer | Substrate (B)-1 | Substrate (B)-1 | Substrate (B)-1 | Substrate (B)-1 | Substrate (B)-1 | — | Substrate (B)-2 |
| Dyeing of the Lower layer | Not done | Not done | Not done | Not done | Not done | — | Not done |
| Bonding resin | Polyester type urethane | Polyester type urethane | Polyester type urethane | Y-301-3 | Polyester type urethane | — | Polyester type urethane |

TABLE 1-continued

| | Example 1 | Example 2 | Example 3 | Example 4 | Comparative Example 1 | Comparative Example 2 | Comparative Example 3 |
|---|---|---|---|---|---|---|---|
| Appearance | ○ | ○ | ○ | ○ | Δ | Δ | ○ |
| Writing | ○ | ○ | ○ | ○ | Δ | Δ | ○ |
| Hand touch | ○ | ○ | ○ | ○ | ○ | ○ | ○ |
| Feel | ○ | ○ | ○ | ○ | x | Δ | Δ |
| Folds | ○ | ○ | ○ | ○ | x | x | x |
| Fastness of Back surface | $5^{th}$ class | $5^{th}$ class | $5^{th}$ class | $5^{th}$ class | $5^{th}$ class | Third class | $5^{th}$ class |
| Water resistance (mm) | 420 | 395 | 410 | >1500 | 430 | 400 | 390 |
| Water-vapor Permeability (g/m²/ 24 h.) | 2390 | 2450 | 2400 | 1450 | 2280 | 2410 | 2430 |
| Ability for Shoemaking (Surface unevenness) | ○ | ○ | ○ | ○ | ○ | ○ | x |
| Resistance Against getting Out of shape | ○ | ○ | ○ | ○ | x | x | ○ |

The leather-like sheet of the present invention is a leather-like sheet having naps on its surface and having writing, a high-class external appearance, hand touch and feel like natural leather, and folds like natural leather. When it is subjected to lasting shoemaking, it is possible to obtain shoes which have at its surface no unevenness and do not get out of shape.

Obviously, numerous modifications and variations of the present invention are possible in light of the above teachings. It is therefore to be understood that within the scope of the appended claims, the invention may be practiced otherwise than as specifically described herein.

This application is based on Japanese Patent Application Ser. No. 45746/1999, filed on Feb. 24, 1999, and Japanese Patent Application Serial No. 201183/1999, filed on Jul. 15, 1999, both of which are incorporated herein by reference in their entirety.

What is claimed as new and desired to be secured by letters patent of the united states is:

1. An artificial leather, comprising:
   a fiber-entangled nonwoven fabric (A),
   a fiber-entangled nonwoven fabric (B) on fabric (A), and
   an adhesive agent in a discontinuous state between fabric (A) and fabric (B), wherein
   (A) is a fiber-entangled nonwoven fabric impregnated with an elastic polymer and comprising a microfine fiber (a) having a fineness of 0.1 denier or less, wherein the surface which is opposite to the surface which is on fabric (B) is napped, and having rupture elongations in the longitudinal and latitudinal directions of 50% or more and 80% or more, respectively, and
   (B) is a fiber-entangled nonwoven fabric impregnated with an elastic polymer and comprising a microfine fiber (b) having a fineness of 0.5 denier or less, the fineness being 4 times or more larger than that of the fiber (a), and having rupture elongations in the longitudinal and latitudinal directions of 50% or more and 80% or more, respectively.

2. The artificial leather of claim 1, wherein the fiber-entangled nonwoven fabric (A) is dyed and the fiber-entangled nonwoven fabric (B) is not substantially dyed.

3. The artificial leather of claim 1, wherein the elastic polymer is polyurethane.

4. The artificial leather of claim 1, wherein the adhesive agent is polyurethane.

5. The artificial leather of claim 1, wherein the amount of the adhesive agent is from 1 to 30 g/m² as a solid basis.

6. The artificial leather of claim 1, wherein the thickness of the fiber-entangled nonwoven fabric (A) is 0.25–1.8 mm and the thickness of the fiber-entangled nonwoven fabric (B) is 0.25–2.5 mm.

7. The artificial leather of claim 1, further comprising a film layer (C) comprising an elastic polymer and having moisture permeability, wherein film layer (C) is between the fiber-entangled nonwoven fabrics (A) and (B), and an adhesive agent in a discontinuous state between layers (A), (B) and (C).

8. The artificial leather of claim 7, wherein the thickness of the film layer (C) is 5–40 μm.

9. The artificial leather of claim 7, wherein the polymer in the film layer (C) is a polyurethane resin having a polyether chain as its main chain.

10. The artificial leather of claim 7, wherein the rupture elongation of the film constituting the (C) layer is larger than either elongation of the fiber-entangled nonwoven fabrics constituting the (A) layer and (B) layer by 10% or more.

11. A method of producing the artificial leather of claim 1, comprising adhering fabric (A) and fabric (B) with said adhesive agent.

12. A method of making a shoe, comprising forming a shoe from the artificial leather of claim 1.

13. A shoe obtained by the method of claim 12.

* * * * *